(12) United States Patent
Kader

(10) Patent No.: US 12,483,914 B2
(45) Date of Patent: Nov. 25, 2025

(54) THROUGHPUT ESTIMATION AND TROUBLESHOOTING FOR WIRELESS GATEWAY DEVICES

(71) Applicant: T-Mobile Innovations LLC, Overland Park, KS (US)

(72) Inventor: Imran Kader, Plano, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 350 days.

(21) Appl. No.: 18/333,702

(22) Filed: Jun. 13, 2023

(65) Prior Publication Data
US 2024/0422593 A1    Dec. 19, 2024

(51) Int. Cl.
| | |
|---|---|
| H04B 17/309 | (2015.01) |
| H04B 17/391 | (2015.01) |
| H04L 43/04 | (2022.01) |
| H04L 43/0888 | (2022.01) |
| H04W 24/08 | (2009.01) |
| H04W 24/10 | (2009.01) |
| H04W 84/02 | (2009.01) |
| H04W 88/16 | (2009.01) |
| H04W 88/18 | (2009.01) |
| H04W 92/02 | (2009.01) |
| H04W 92/06 | (2009.01) |

(52) U.S. Cl.
CPC .......... *H04W 24/08* (2013.01); *H04B 17/309* (2015.01); *H04B 17/3913* (2015.01); *H04L 43/04* (2013.01); *H04L 43/0888* (2013.01); *H04W 24/10* (2013.01); *H04W 84/02* (2013.01); *H04W 88/16* (2013.01); *H04W 88/18* (2013.01); *H04W 92/02* (2013.01); *H04W 92/06* (2013.01)

(58) Field of Classification Search
CPC ......... H04B 17/0082–409; H04L 41/02–5096; H04L 43/02–55; H04W 16/18–225; H04W 24/02–10; H04W 84/02–16; H04W 88/005–188; H04W 92/02–24
See application file for complete search history.

(56) References Cited

U.S. PATENT DOCUMENTS

| | | | |
|---|---|---|---|
| 10,667,152 B2 | 5/2020 | Ku et al. | |
| 2017/0026859 A1* | 1/2017 | Ahmadzadeh | ........ H04W 24/08 |
| 2019/0098641 A1 | 3/2019 | Takahashi et al. | |
| 2023/0397050 A1* | 12/2023 | Alvarado | .......... H04W 28/0236 |

* cited by examiner

*Primary Examiner* — Timothy J Weidner
(74) *Attorney, Agent, or Firm* — Jones Robb, PLLC

(57) ABSTRACT

A method for throughput estimation and troubleshooting includes collecting RF parameters from wireless gateway devices. The method additionally includes estimating a throughput of multiple wireless gateway devices based on collected RF parameters and maintaining a profile including RF parameters and estimated throughput over time. The method further includes troubleshooting for selected wireless gateway devices based on the throughput estimate.

20 Claims, 7 Drawing Sheets

THROUGHPUT ESTIMATION AND TROUBLESHOOTING FOR WIRELESS GATEWAY DEVICES

TECHNICAL BACKGROUND

A wireless network, such as a cellular network, can include an access node (e.g., base station) serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems. Wireless devices closer to a 5G antenna are more likely to receive the benefits of the 5G technology.

The evolving capabilities of cellular systems have led to expanded use of such systems for Internet access. Thus, instead of traditional wired broadband connections, it has become possible to access the Internet through cellular technologies. These cellular technologies may utilize, for example, mobile broadband devices or fixed wireless access (FWA) devices. More recently, wireless gateway devices have become popular for home use. Such wireless gateway devices provide Internet access through the use of 4G and/or 5G networks and further provide wireless local area network (WLAN) capabilities enabling home devices to join a WLAN in order to obtain Internet access.

Currently, no convenient method exists for determining expected throughput for wireless gateway devices. Throughput may generally refer to a file size divided by the transmission time and can be measured by a speed tests. While it is possible to collect speed test data for these wireless gateway devices, the process is intrusive and network taxing and can typically only be done during low traffic hours, such as between, for example 1 AM and 6 AM.

Data collected during these hours is not representative of the conditions during peak hours. Thus, when wireless gateway device users contact customer support during peak hours regarding diminished capabilities, support personnel have no acceptable expected throughput baseline for comparison as the measured baseline reflects off-peak hours.

Accordingly, a solution is needed for creating a baseline for expected throughput for wireless gateway devices during all hours. The expected throughput would provide a baseline for comparison to existing conditions to enhance troubleshooting operations.

Overview

Exemplary embodiments described herein include systems, methods, and non-transitory computer readable mediums for creating a baseline throughput estimate and thereby improving troubleshooting for wireless gateway devices based on the estimated throughput. An exemplary method includes collecting radio frequency (RF) telemetry data from multiple wireless gateway devices over time. The method additionally includes estimating throughput for the wireless gateway devices based on the RF telemetry device data. The method additionally includes maintaining a profile of the wireless gateway devices including the collected RF telemetry data and the throughput estimate. The method additionally includes troubleshooting for a selected wireless gateway device based on the throughput estimate.

An additional exemplary embodiment includes a system configured for improving troubleshooting for wireless gateway devices based on estimated throughput. The system includes a memory storing wireless gateway device profiles including collected radio frequency (RF) telemetry data from multiple wireless gateway devices over time and estimated throughput based on the RF telemetry data. The system further includes at least one processor performing multiple operations. The operations include estimating the throughput based on based the collected RF telemetry data accessed from the memory and maintaining the wireless gateway device profiles. The operations further include troubleshooting for a selected wireless gateway device based on the throughput estimate.

In yet a further exemplary embodiment, a non-transitory computer readable medium is provided for improving troubleshooting for wireless gateway devices based on estimated throughput. The non-transitory computer-readable medium stores instructions executed by a processor to perform multiple operations. The operations include maintaining a profile of multiple wireless gateway devices based on collected RF telemetry data. The operations further include estimating a throughput for a selected wireless gateway device based on the RF telemetry data and storing the estimated throughput in the profile. The operations further include troubleshooting for a selected wireless gateway device based on the stored throughput estimate.

DETAILED DESCRIPTION

Figure 1:
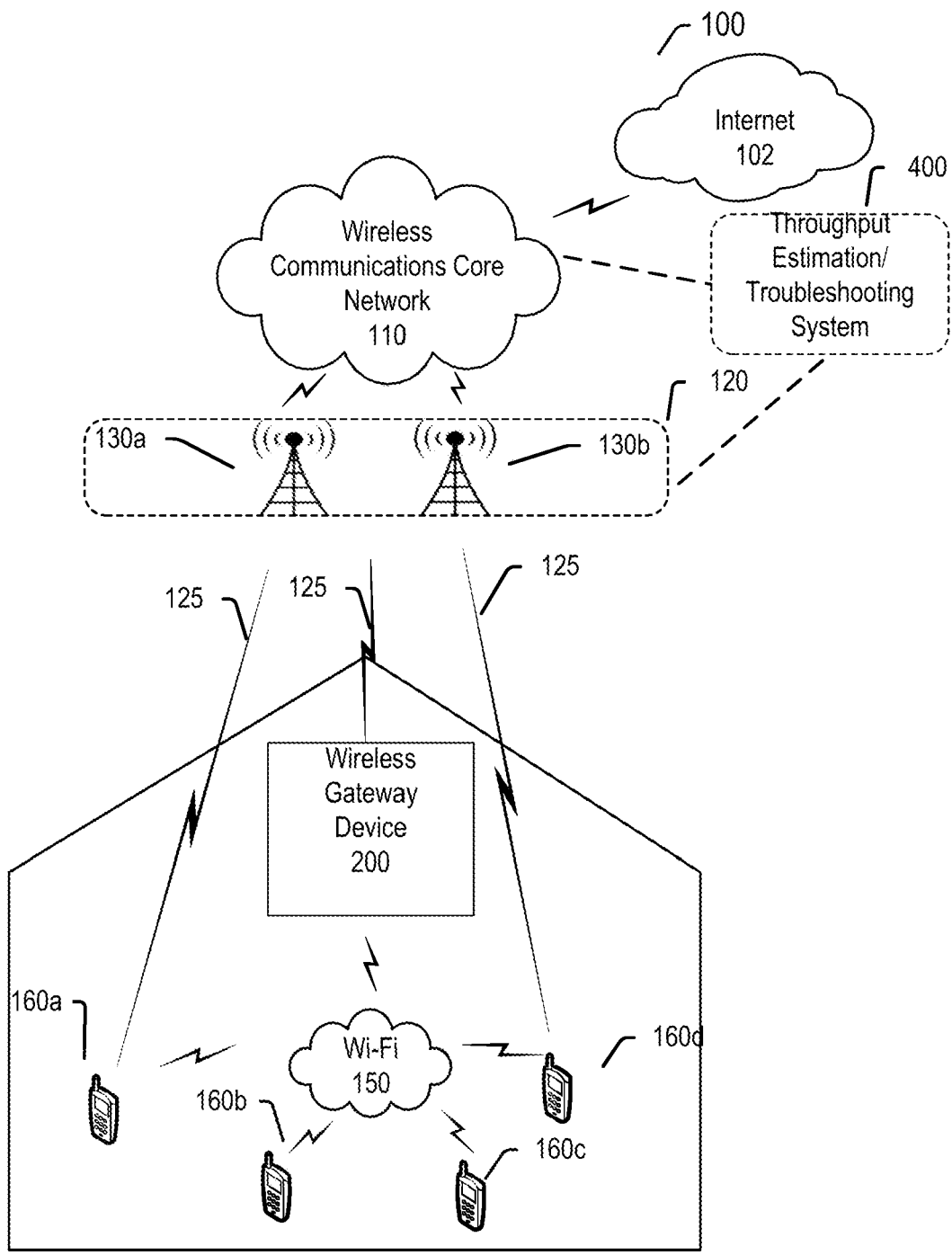
FIG. 1 depicts an exemplary wireless communication network, in accordance with the disclosed embodiments.

Exemplary embodiments described herein include systems, methods, and computer readable mediums for estimating throughput for wireless gateway devices (Wi-Fi gateways) and for improving troubleshooting based on the estimated throughput. The wireless gateway devices allow connection over a cellular network to the Internet and may also referred to as home internet (HINT) devices. These wireless gateway devices or HINTS operate effectively in areas with a strong cellular signal. By operating on radio frequency (RF) telemetry parameters periodically provided by a wireless gateway device, embodiments provided herein establish a baseline throughput for the wireless device during peak hours. The established baseline throughput can be used for troubleshooting reported issues with the wireless gateway devices.

Wi-Fi gateways may, for example, include a router/modem combination allowing wireless devices to connect to Wi-Fi and further to connect to the Internet through the use of cellular network. The cellular network may, for example, utilize 4G LTE or 5G RATs. Other RATs may alternatively or additionally be implemented. The Wi-Fi gateways have functionality that allows them to periodically transmit RF telemetry parameters and other data to an access node. The RF telemetry parameters may include, for example, reference signal received power (RSRP), reference signal received quality (RSRQ), and signal to noise and interference ratio (SINR). Additionally, the Wi-Fi gateway device may be associated with a particular technology, such as 4G or 5G. Further, in embodiments set forth herein, access node information, such as band, bandwidth, and architecture (e.g., 5G stand-alone (5GSA), 5G non-stand-alone (5GNSA)) can also be transmitted by the wireless gateway device and incorporated in a model for throughput estimation.

In particular, embodiments set forth herein include enhanced logic for estimating throughput for the Wi-Fi gateway devices on a time incremental basis, for example, an hourly basis, although smaller or larger time increments can also be used. In embodiments set forth herein, because it is impractical to perform speed testing during peak hours, for example, 9 AM to 6 PM, throughput estimates are performed for those hours based on parameters that are regularly transmitted.

These throughput estimates can be used for troubleshooting operations. Currently, when Wi-Fi gateway users contact a support line to resolve speed issues, customer support has no information regarding either the current throughput of the Wi-Fi gateway device or about the expected throughput during the particular time of concern if that time of concern is during peak hours. In order to determine a current throughput for the Wi-Fi gateway device, a speed test can be performed. However, customer support has no accurate reference to compare with the current speed to ascertain whether the current speed is within an expected range. Further, the speed test itself consumes excessive resources during peak hours. Thus, the current solution offers the capability to compare a current estimated throughput with a historical estimated throughput from a Wi-Fi gateway device profile storing collected parameters over time as well as the throughput associated with the collected parameters. For example, for a Wi-Fi gateway device experiencing throughput issues at 10 AM, a troubleshooting method can capture the most recently collected RF parameters and perform a throughput estimate based on those parameters. The troubleshooting method can then compare the current throughput estimate to a 10 AM throughput estimate stored in the Wi-Fi gateway device profile. Alternatively, if a speed test is performed, current speed test results can be compared to the throughput estimate stored in the Wi-Fi gateway device profile.

In embodiments disclosed herein, a cell or wireless network may be provided by an access node. The access node may utilize one or more antennas to communicate with wireless devices or user equipment (UEs), such as for example, wireless phones and wireless gateway devices. Performance at a particular wireless gateway device may be dependent on a number of factors including, for example, signal strength parameters and interference indicators.

An exemplary system described herein includes a throughput estimation and troubleshooting system, at least an access node (or base station), such as an eNodeB, or gNodeB, as well as one or more wireless gateway devices and a plurality of end-user wireless devices. For illustrative purposes and simplicity, the disclosed technology including a troubleshooting and throughput estimation system will be illustrated and discussed as being implemented in the communications between an access node (e.g., a base station) and a wireless gateway device, Wi-Fi gateway device, or HINT device It is understood that the disclosed technology may also be applied to communication between an end-user wireless device and various network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for troubleshooting and estimating throughput may be implemented as computer-readable instructions implemented by a wireless device or network nodes such as processing nodes. The processing node may include a processor included in the access node or a processor included in any controller node in the wireless network that is coupled to the access node.

FIG. 1 depicts an exemplary communication network 100. A core network 110 is coupled to a radio access network (RAN) 120 including access nodes 130a, 130b. The core network 110 and RAN 120 serve a wireless gateway device 200 and wireless devices 160a, 160b, 160c, 160d over communication links. The wireless devices 160a, 160b, 160c, 160d can include end-user wireless devices (e.g., UEs). The communication links 125 use 5G NR, 4G LTE, or any other suitable type of radio access technology (RAT). Core network 110 can be structured as an evolved packet core (EPC) network or as a 5G core using a service-based architecture (SBA) utilizing core network functions and elements, including, for example, user plane functions (UPF) control plane functions (CPF). The core network 110 provides access to the Internet 102.

The RAN 120 can include various access network functions and devices disposed between the core network 110 and the wireless devices 160a, 160b, 160c, 160d. For example, the RAN 120 includes at least an access node (or base station), such as eNodeB and/or gNodeB 130a, 130b communicating with the plurality of wireless devices 160a, 160b, 160c, 160d. It is understood that the disclosed technology may also be applied to communication between an end-user wireless device and other network resources, depending on the RAT and network technology being implemented. Further, either of core network 110 and RAN 120 can include one or more of a local area network, a wide area network, and an internetwork (including the Internet) capable of communicating signals and carrying data, for example, to support voice, push-to-talk, broadcast video, and data communications by wireless devices 160a, 160b, 160c, 160d. Alternatively or additionally to the UPF and CPF, the illustrated network topology can include packet gateways, such as a CUPS based user plane S-GW, P-GW, or SAE-GW.

The core network 110 may incorporate many functions not shown in FIG. 1. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR).

The communication network 100 may further include a throughput estimation and troubleshooting system 400, which is illustrated as operating between the core network 110 and the RAN 170. However, it should be noted that the throughput estimation and troubleshooting system 400 may be distributed. For example, the throughput estimation and troubleshooting system 400 may utilize components located at both the core network 110 and at the multiple access nodes 130a, 130b. Alternatively, the throughput estimation and troubleshooting system 400 may be an entirely discrete system operating within the core network 110 or between the core network 110 and the RAN 120 or within the RAN 120.

The throughput estimation and troubleshooting system 400 receives information pertaining to signal strength, signal quality and interference for wireless gateway devices 200. For example, the troubleshooting and throughput estimation system 400 may receive RSRP, RSRQ, and/or SINR measurements to name a few parameters. Further, information pertaining to frequency band, bandwidth, and access technology may also be transmitted. In embodiments set forth herein, the wireless gateway device 200 may send these parameters to the access nodes 130a and 130b, which convey the parameters to the throughput estimation and troubleshooting system 400.

The troubleshooting and throughput estimation system 400 analyzes this information in accordance with a stored model in order to create and store a wireless gateway device profile. In embodiments set forth herein, the wireless gateway device profile may represent performance of a single wireless gateway device 200 or alternatively may represent performance of multiple wireless gateway devices, such as all wireless gateway devices operating within a network. Further, the troubleshooting and throughput estimation system 400 may operate in troubleshooting mode to estimate a current throughput of a wireless gateway device 200 and to compare the current estimated throughput to a corresponding stored estimated throughput at a similar time of day. Based on this comparison, the troubleshooting and throughput estimation system 400 may determine whether the current throughput is within range of the expected throughput. If the current throughput is below an expected throughput range, the troubleshooting and throughput estimation system 400 may explore root causes (e.g., network or device issues) so that it can recommend remediation as any specific remediation measures would depend upon the root cause of the performance problem.

Wireless devices 160a, 160b, 160c, 160d may be any device, system, combination of devices, or other such communication platform capable of communicating wirelessly with RAN 120 using one or more frequency bands deployed therefrom. Each of the wireless devices 160a, 160b, 160c, 160d may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via RAN 120. Wireless devices 160a, 160b, 160c, 160d may also include, for example Internet of Things (IoT) devices. Although four wireless devices are illustrated in FIG. 1, any number of wireless devices may be included.

The wireless gateway device 200 may be or include a router or router/modem combination that deploys a wireless local area network (WLAN) 150 providing Internet access via Wi-Fi to wireless devices 160a, 160b, 160c, 160d.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

Figure 2:
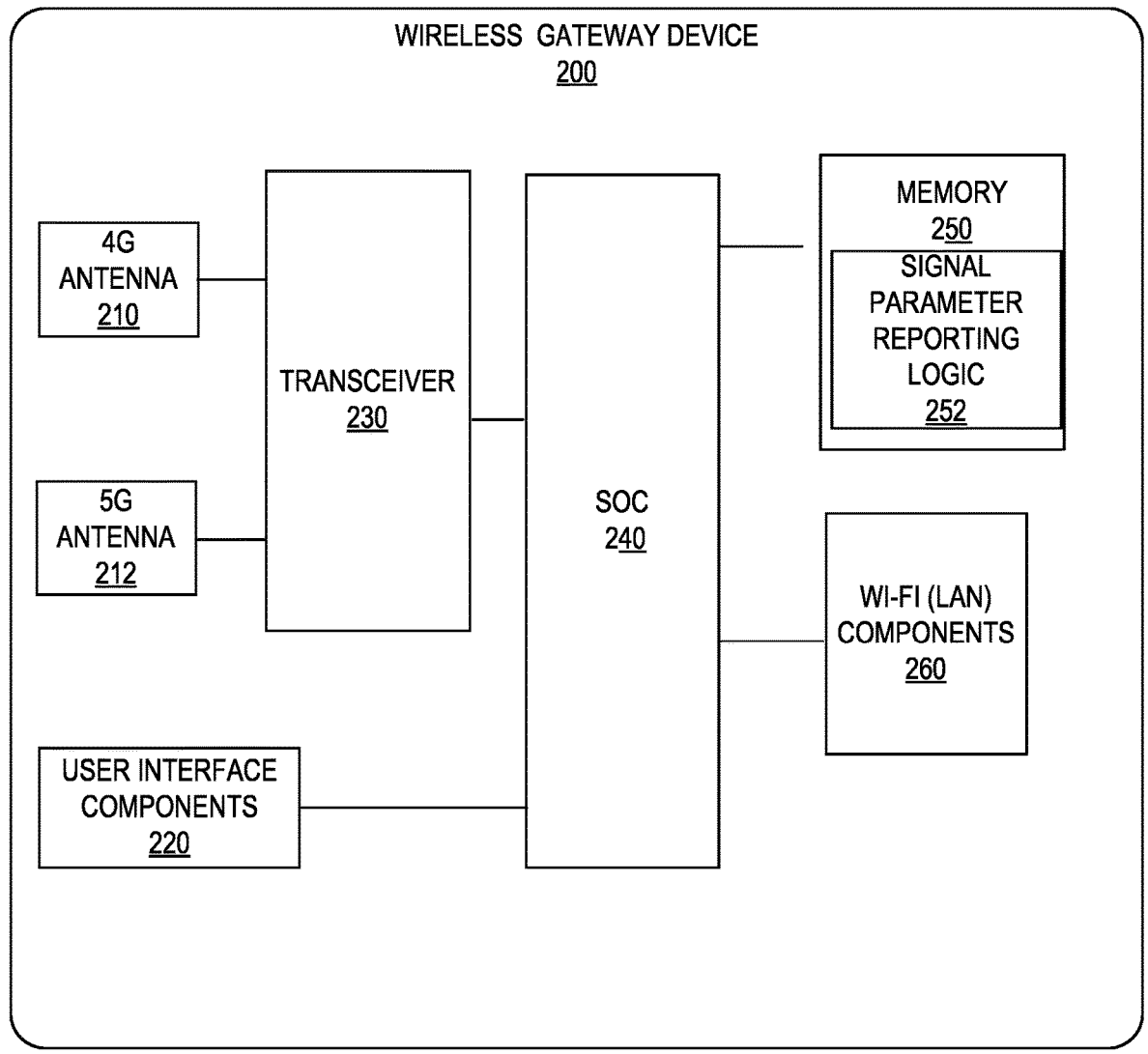
FIG. 2 depicts an exemplary wireless gateway device in accordance with disclosed embodiments.

FIG. 2 illustrates a wireless gateway device 200 in accordance with embodiments described herein. The components described herein are merely exemplary as many different configurations for the wireless gateway device 200 may be implemented. The wireless gateway device 200 may include, for example, multiple antennas for communicating with a cellular network such as antenna 210 and antenna 212. Different antennas may connect with different RATs. For example, antenna 210 may connect with a 4G RAT and antenna 212 may communicate with a 5G RAT. The wireless gateway device 200 may further include a transceiver 230, a system on chip (SoC) 240, a memory 250, and Wi-Fi or LAN components 260. Other components may also be included.

The user interface components 220 may operate to allow set-up of the wireless gateway device 200 directly from the wireless gateway device 200. Alternatively, wireless gateway device 200 may be configured to interact with a wireless device, for example using a mobile app, for setup purposes.

The SoC 240 is an integrated circuit that integrates most or all components of a computer or other electronic system. The SoC 240 includes a central processing unit (CPU), memory interfaces, on-chip input/output devices, input/output interfaces, and secondary storage interfaces. Other components, such as a radio modem and radio frequency signal processing may also be included.

The SoC 240 integrates a microcontroller, microprocessor or perhaps several processor cores with peripherals like a GPU, Wi-Fi and cellular network radio modems, and/or one or more coprocessors. The components of the SoC 240 cause the wireless gateway device 200 to function as a both a router and a modem in order to ensure wireless devices access to the Internet through a WLAN. The Wi-Fi or LAN components 260 may include additional antennas, transceivers, and other components to provide the WLAN. In additional embodiments ethernet technologies are incorporated in the wireless gateway device 200 to add to its functionality.

The memory 250 may be or include a random access memory (RAM), read only memory (ROM), disk drive, a flash drive, a memory, or other storage device configured to store data and/or computer readable instructions or codes (e.g., software). The memory 250 may store signal parameter reporting logic 252. The signal parameter reporting logic 252 may be executed by processor, for example a processor of the SoC 240 in order to report signal parameters to the troubleshooting and throughput estimation system 400. In embodiments provided herein, the signal parameter reporting logic causes the Wi-Fi gateway device 200 to report parameters including, for example SINR, RSRP, and RSRQ periodically, for example, every ten minutes, or at any other appropriate interval to the troubleshooting and throughput estimation system 400. Other types of data may also be reported.

Figure 3:
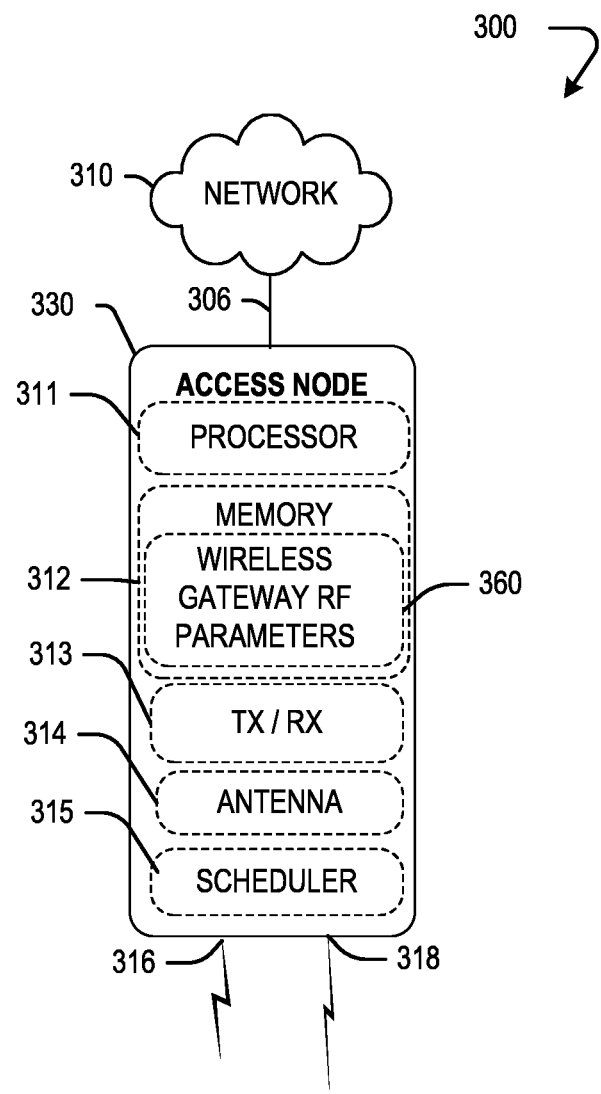
FIG. 3 depicts an exemplary access node in accordance with disclosed embodiments.

FIG. 3 illustrates an operating environment 300 for an exemplary access node 330 in accordance with the disclosed embodiments. In exemplary embodiments, access node 330 can include, for example, a gNodeB or an eNodeB. Access node 330 may comprise, for example, a macro-cell access node, such as access nodes 130a and 130b described with reference to FIG. 1. Access node 330 is illustrated as comprising a processor 311, memory 312, transceiver(s) 313, and antenna(s) 314, and scheduler 315. Processor 311 executes instructions stored on memory 312, while transceiver(s) 313 and antenna(s) 314 enable wireless communication with other network nodes, such as wireless devices and wireless gateway devices described herein, and other nodes. For example, wireless devices and wireless gateway devices 200 may initiate uplink transmissions such that the transceivers 313 and antennas 314 receive messages from the wireless devices, for example, over communication links 316 and 318 and pass the messages to a mobility entity in the core network. Further, the transceivers 313 and antennas 314 receive signals from the mobility entity such as a mobility management entity (MME) or access and mobility function (AMF) and pass the messages to the appropriate wireless device. Scheduler 315 may be provided for scheduling resources based on the presence and performance parameters of the wireless devices. The access node 330 may connect over a communication link 306 to a network 310. Network 310 may be similar to core network 110 discussed above.

In embodiments provided herein, the memory 312 may further store wireless gateway RF parameters 360. Thus, a processor from the troubleshooting and throughput estimation system 400 may communicate with the access node 330 in order to receive relevant RF parameters for the wireless gateway devices 200.

Figure 4:
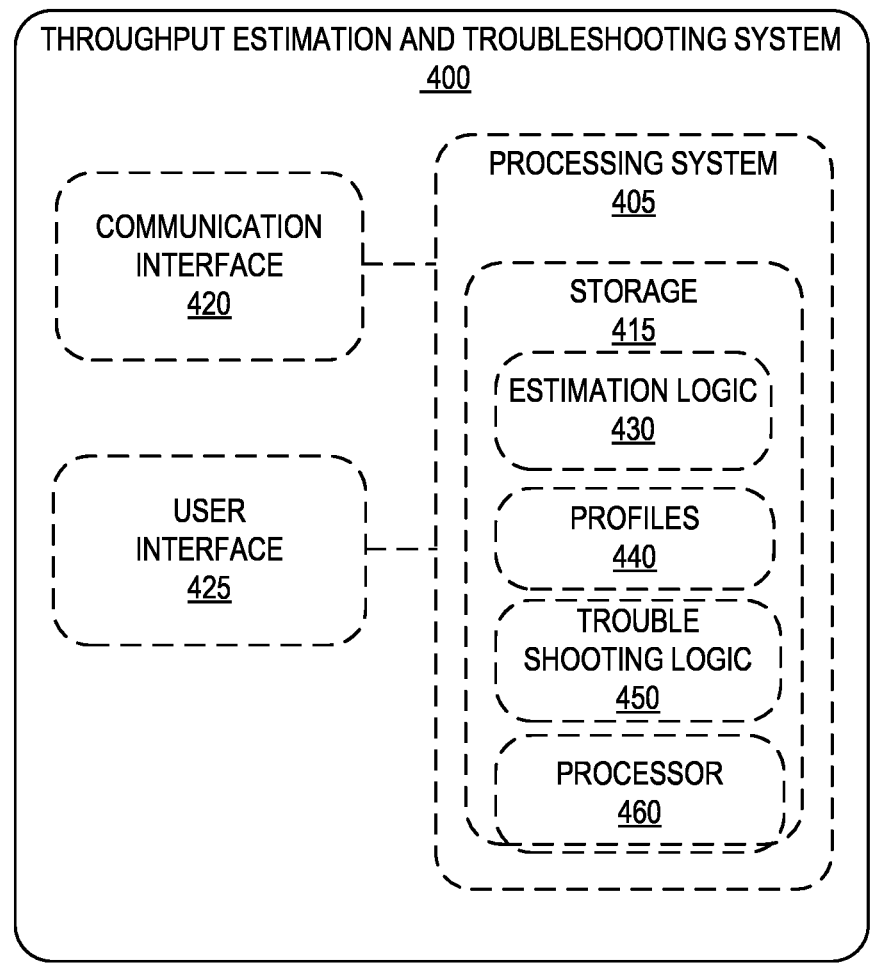
FIG. 4 depicts an exemplary throughput estimation and troubleshooting system in accordance with disclosed embodiments.

FIG. 4 depicts an exemplary throughput estimation and troubleshooting system 400 in communication with wireless gateway devices 200 in accordance with embodiments set forth herein. The throughput estimation and troubleshooting system 400 may be configured to perform the methods and operations disclosed herein to receive relevant RF telemetry parameters and other data from the wireless gateway device 200 to create a wireless gateway device profile and generate a throughput estimation. In the disclosed embodiments, the throughput estimation and troubleshooting system 400 may be integrated with the core network 110 or may be an entirely separate component capable of communicating with at least the wireless gateway devices 200 and the RAN 120.

The throughput estimation and troubleshooting system 400 may be configured for monitoring parameters transmitted by the wireless gateway device 200 at frequent intervals in order to apply a model and estimate throughput. Further, the throughput estimation and troubleshooting system 400 may estimate throughput for troubleshooting based on a current transmission of RF parameters from the wireless gateway device 200.

To estimate throughput and perform troubleshooting, the throughput estimation and troubleshooting system 400 may utilize a processing system 405. Processing system 405 may include a processor 410 and a storage device 415. Storage device 415 may include a RAM, ROM, disk drive, a flash drive, a memory, or other storage device configured to store data and/or computer readable instructions or codes (e.g., software). The computer executable instructions or codes may be accessed and executed by processor 405 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. For example, estimation logic 430 may store instructions to estimate throughput based on multiple variables including the RF parameters collected from the wireless gateway device 200. For example estimation logic 430 may apply a function such as:

$$\text{Wireless Gateway Device Throughout Hourly Estimate} = \quad (1)$$
$$f(\text{Acess Technology}, RSRP, RSRQ, \text{Cell Bandwidth}) *$$
$$(\text{Hourly Profile of wireless gateway device})$$

The function illustrated above may be applied to all wireless devices in the network or a subset of wireless devices in the network in order to create a throughput estimate. To perform this estimate, the estimation logic 430 may be executed by the processor 460. Thus, the throughput during any particular hour is a function of access technology, RSRP, RSRQ, and cell bandwidth during any given hour. The access technology may include, for example, 4G LTE, 5GSA, or 5G NSA. Other parameters, such as the particular band or SINR may alternatively or additionally be considered.

Further, the throughput estimation and troubleshooting system 400 may store profiles of the wireless gateway devices. The profiles may include historical storage of the parameters described above per hour. The profiles may be limited to peak hours since speed tests can be performed for non-peak hours. An exemplary profile is illustrated below in Table 1.

TABLE 1

| DATE | HOUR | TECH | RSRP | RSRQ | BAND | BW |
|---|---|---|---|---|---|---|
| 2023 Mar. 6 | 9 | 5GNSA | −103 | −9 | N41 | 100 |
| 2023 Mar. 6 | 10 | 5GNSA | −103 | −9 | N41 | 100 |
| 2023 Mar. 6 | 11 | 5GSA | −105 | −10 | N41 | 100 |
| 2023 Mar. 6 | 12 | LTE | −103 | −6 | N41 | 100 |
| 2023 Mar. 6 | 13 | LTE | −105 | −7 | N41 | 100 |

As illustrated, a profile 440 may include an hour of the day, a technology, RSRP, RSRQ, band, and bandwidth. Additional or alternative parameters may also be included. For example, once throughput is estimated, the corresponding throughput may also be included in the profile 440. Profiles 440 can be stored and can be further accessed when implementing trouble shooting logic 450, which may be executed by the processor 460 to perform troubleshooting in response to a request from a wireless gateway device user. The troubleshooting logic 450 can compare current wireless gateway device conditions to corresponding historical wireless gateway device conditions by comparing recently transmitted RF parameters from the wireless gateway device 200 with the wireless gateway device profiles 440 and throughput estimates described herein. Troubleshooting operations are further explained below with respect to FIGS. 6 and 7. Processor 460 may be a microprocessor and may include hardware circuitry and/or embedded codes configured to retrieve and execute software stored in storage device 415.

The throughput estimation and troubleshooting system 400 further includes a communication interface 420 and a user interface 425. Communication interface 420 may be configured to enable the processing system 405 to communicate with other components, nodes, or devices in the wireless network. For example, the throughput estimation and troubleshooting system 400 receives relevant parameters from an access node 300 or from the wireless gateway devices 200.

Communication interface 420 may include hardware components, such as network communication ports, devices, routers, wires, antenna, transceivers, etc. User interface 425 may be configured to allow a user to provide input to the throughput estimation and troubleshooting system 400 and receive data or information from access node 300 or the wireless gateway devices 200. User interface 425 may include hardware components, such as touch screens, buttons, displays, speakers, etc. The throughput estimation and troubleshooting system 400 may further include other components such as a power management unit, a control interface unit, etc.

The location of the throughput estimation and troubleshooting system 400 may depend upon the network architecture. As set forth above, the throughput estimation and troubleshooting system 400 may be located in the core network 110, in a separate processing node, may be an entirely discrete component, or may be distributed. Further, although shown as a single integrated system. For example, the functions of throughput estimation and troubleshooting may be separated and disposed in separate locations.

Figure 5:
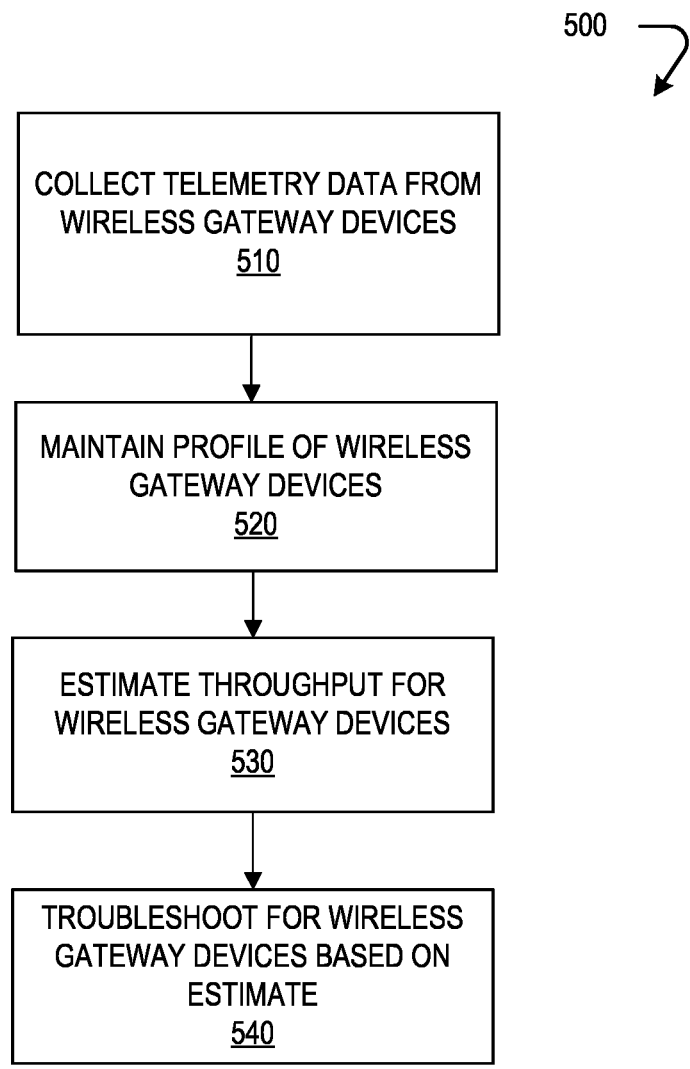
FIG. 5 is a flow chart illustrating a method for throughput estimation and
troubleshooting in accordance with one disclosed embodiment.

The disclosed methods for throughput estimation and troubleshooting are further described below with reference to FIGS. 5-7. FIG. 5 illustrates an exemplary method 500 performed by a throughput estimation and troubleshooting system 400. Method 500 may be performed by any suitable processor discussed herein, for example, the processor 460 included in the throughput estimation and troubleshooting system 400 or any other suitable processor. For the sake of convenience, the method is described as being performed by the processor 460.

Method 500 starts in step 510, when the processor 460 collects telemetry data from the wireless gateway device 200. For example, the wireless gateway device 200 transmits telemetry data and other information at regular intervals to the throughput estimation and troubleshooting system 400. The RF telemetry data may include for example, RSRP, RSRQ, and SINR. The wireless gateway device 200 may also transmit the access technology, band, and bandwidth.

Based on the data collected in step 510, the processor 460 builds and maintains wireless device profiles in step 520 as explained above. The profiles may contain information such as that shown in TABLE 1 including the collected data as well as time of day. Thus the profile includes the data for the wireless gateway device as well as the hour of transmission.

Subsequently, in step 530, processor 460 applies the model shown above in equation (1) or a similar model to estimate throughput of the wireless gateway devices 200 during each hour recorded. As set forth herein, peak hours are of particular concern, as speed tests are not performed during those hours. The estimated throughput provides a performance baseline for the wireless gateway devices during particular times of day.

Finally, in step 540, the processor 460 performs troubleshooting based on the throughput estimate for the applicable time of day. Thus, troubleshooting for a selected wireless gateway device 200 is based on a selected throughput estimate from the profile. For example, if a wireless gateway device user contacts customer support to complain about inadequate performance, the processor 460 can compare the current performance to the performance baseline for that particular time of day.

Figure 6:
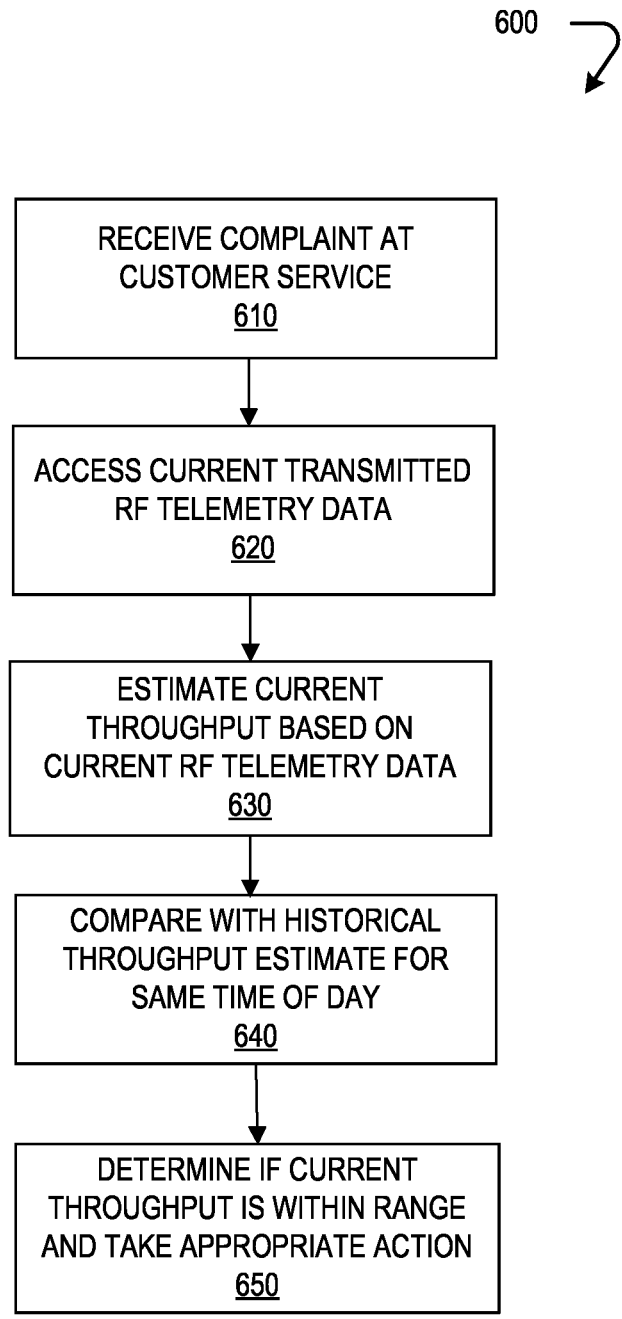
FIG. 6 is a flow chart illustrating a troubleshooting method in accordance with a disclosed embodiment.

FIG. 6 illustrates a further method 600 for troubleshooting for a wireless gateway device user in accordance with embodiments set forth herein. Method 600 may be performed by a processor, for example, the processor 460 in the throughput estimation and troubleshooting system 400. Alternatively, the steps may be performed by a processor of an access node, or another processor in the system. For the sake of illustration, the method is described as being performed by the processor 460.

Method 600 starts in step 610, when the throughput estimation and troubleshooting system 400 receives a complaint pertaining to performance of a wireless gateway device 200. The complaint may be through any platform or channel, such as via phone complaint, a text complaint, or an online chat complaint.

Upon receiving the complaint in step 610, the processor 460 accesses the currently transmitted data for the wireless gateway device 200 in step 620. For example, the processor 460 accesses the data including the RF parameters transmitted within the last ten minutes to assess current RF conditions at the wireless gateway device 200. Further, in step 630, the processor 460 may apply the estimation logic to estimate current throughput for the wireless gateway device 200.

In step 640, the processor 460 compares a corresponding throughput estimate, i.e., the historical throughput estimate for the same or corresponding time of day, with the current throughput estimate. Finally, in step 650, the processor 460 determines if the current throughput is within a predetermined range of the historical throughput. When the processor 460 determines that the current throughput is within or above the predetermined range, no corrective action is required. However, if the current throughput falls below and outside of the predetermined range, the processor 460 recommends remedial action based on network or device conditions.

Figure 7:
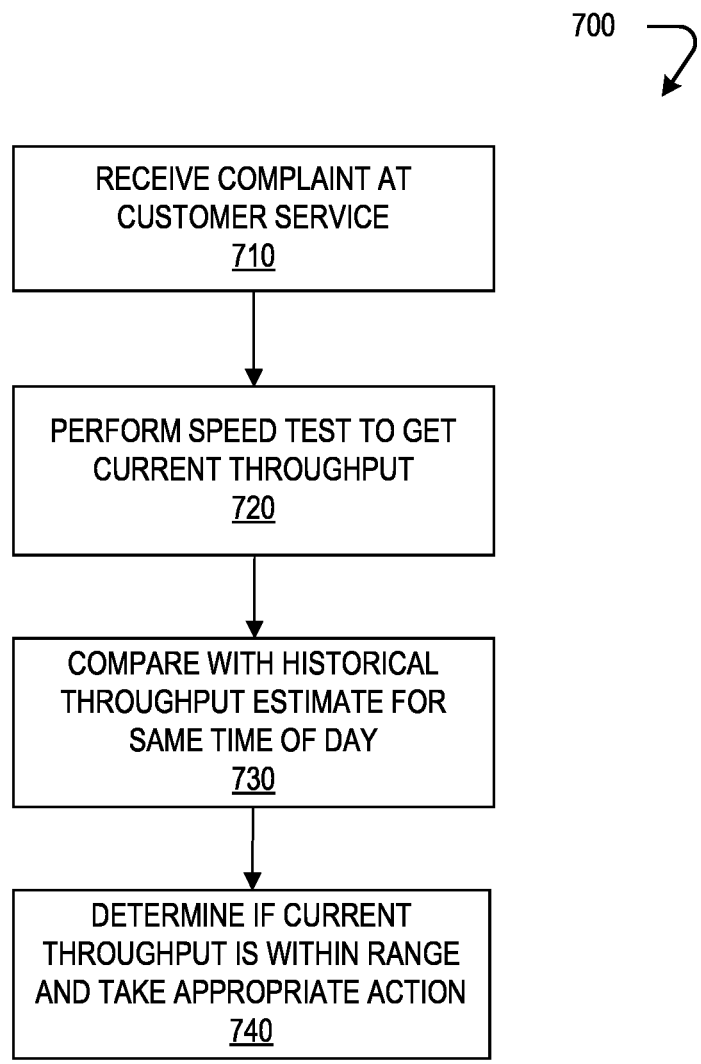
FIG. 7 is a flow chart illustrating a troubleshooting method in accordance with a further disclosed embodiment.

FIG. 7 illustrates a further method 700 for troubleshooting for a wireless gateway device user in accordance with embodiments set forth herein. Method 700 may be performed by a processor, for example, the processor 460 in the throughput estimation and troubleshooting system 400. Alternatively, the steps may be performed by a processor of an access node, or another processor in the system. For the sake of illustration, the method is described as being performed by the processor 460.

Method 700 starts in step 710, when the throughput estimation and troubleshooting system 400 receives a complaint pertaining to performance of a wireless gateway device 200. The complaint may be through any platform or channel, such as via phone complaint, a text complaint, or an online chat complaint.

Upon receiving the complaint in step 710, the processor 460 causes a speed test to be performed to get current throughput for the for the wireless gateway device 200 in step 720. Although routine speed tests consume excessive resources, it is possible to perform speed tests only upon receiving a complaint, thus ascertaining current actual throughput for wireless gateway devices 200 experiencing throughout issues.

In step 730, the processor 460 compares a historical throughput estimate for the same time of day with the current measured throughput. Finally, in step 640, the processor 460 determines if the current measured throughput is within a predetermined range of the historical throughput.

When the processor 460 determines that the throughput is within the predetermined range or above the predetermined range, no corrective action is required. However, if the current throughput falls below and outside of the predetermined range, the processor 460 recommends remedial action based on network or device conditions.

In some embodiments, methods 500, 600, and 700 may include additional steps or operations. Furthermore, the methods may include steps shown in each of the other methods. As one of ordinary skill in the art would understand, the methods 500, 600, and 700 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication network 100 may be, comprise, or include computers systems and/or processing nodes, including access nodes, controller nodes, and gateway nodes described herein.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    collecting radio frequency (RF) telemetry data from multiple wireless gateway devices over time;
    estimating throughput for wireless gateway devices based on the RF telemetry data;
    maintaining a profile of the wireless gateway devices including the estimated throughput and the collected RF telemetry data; and
    troubleshooting for a selected wireless gateway device based on a selected throughput estimate from the profile.

2. The method of claim 1, wherein collecting RF telemetry data comprises collecting reference signal received power (RSRP) and reference signal received quality (RSRQ).

3. The method of claim 1, further comprising estimating the throughput based on an access technology.

4. The method of claim 1, further comprising estimating the throughput based on a cell bandwidth.

5. The method of claim 1, wherein the selected throughput estimate comprises a throughput estimate in the profile from a corresponding time of day.

6. The method of claim 1, wherein maintaining the profile of the wireless gateway devices comprises maintaining an hourly profile over time.

7. The method of claim 1, wherein troubleshooting comprises estimating current throughput based on current RF parameters and comparing current estimated throughput to a throughput estimate from the profile.

8. The method of claim 1, wherein troubleshooting comprises performing a speed test to determine current throughput and comparing the current throughput to a throughput estimate from the profile.

9. The method of claim 1, further comprising storing instructions at an access node for estimating the wireless gateway device throughput.

10. The method of claim 9, further comprising retrieving the estimated wireless gateway device throughput from the access node.

11. A system comprising:
    a memory storing wireless gateway device profiles including collected radio frequency (RF) telemetry data from multiple wireless gateway devices over time and an estimated throughput;
    at least one processor performing operations including;
        estimating the throughput for the wireless gateway devices based on the collected RF telemetry data;
        maintaining the wireless gateway device profiles; and
        troubleshooting for a selected wireless gateway device based on a selected throughput estimate from the wireless gateway device profiles.

12. The system of claim 11, wherein the RF telemetry data comprises reference signal received power (RSRP) and reference signal received quality (RSRQ).

13. The system of claim 12, the operations further comprising estimating the throughput based on a cell bandwidth.

14. The system of claim 13, the operations further comprising estimating the throughput based on a profile of the selected wireless gateway device.

15. The system of claim 11, wherein the selected throughput estimate is from a corresponding time of day.

16. The system of claim 11, wherein troubleshooting comprises estimating current throughput based on current RF parameters and comparing current estimated throughput to a throughput estimate from the profile.

17. The system of claim 11, wherein troubleshooting comprises performing a speed test to determine current throughput and comparing the current throughput to a throughput estimate from the profile.

18. A non-transitory computer-readable medium storing instructions executed by a processor to performing operations comprising:
    maintaining a profile of multiple wireless gateway devices based on collected RF telemetry data;
    estimating a throughput for a selected wireless gateway device based on the RF telemetry data and storing the estimated throughput in the profile; and troubleshooting for a selected wireless gateway device based on a corresponding throughput estimate from the profile.

19. The non-transitory computer readable medium of claim 18, wherein troubleshooting comprises implementing a speed test and comparing speed test results to the corresponding estimated throughput.

20. The non-transitory computer-readable medium of claim 18, wherein troubleshooting comprises estimating current throughput based on current RF parameters and comparing current estimated throughput to a corresponding throughput estimate from the device profile.

\* \* \* \* \*